United States Patent
Barnhill et al.

(10) Patent No.: US 11,997,330 B2
(45) Date of Patent: May 28, 2024

(54) AUDIO SAMPLING CLOCK SYNCHRONIZATION

(71) Applicant: THAT Corporation, Milford, MA (US)

(72) Inventors: Matthew S. Barnhill, Berkeley Lake, GA (US); Roger R. Darr, Tumwater, WA (US); Matthew Easley, Woodstock, GA (US)

(73) Assignee: THAT Corporation, Milford, MA (US)

( * ) Notice: Subject to any disclaimer, the term of this patent is extended or adjusted under 35 U.S.C. 154(b) by 248 days.

(21) Appl. No.: 17/644,674

(22) Filed: Dec. 16, 2021

(65) Prior Publication Data

US 2022/0201349 A1 Jun. 23, 2022

Related U.S. Application Data (60) Provisional application No. 63/126,563, filed on Dec. 17, 2020.

(51) Int. Cl.
*H04N 21/242* (2011.01)
*H04N 21/43* (2011.01)

(52) U.S. Cl.
CPC ....... *H04N 21/242* (2013.01); *H04N 21/4305* (2013.01)

(58) Field of Classification Search
CPC .......................... H04N 21/242; H04N 21/4305
See application file for complete search history.

(56) References Cited

U.S. PATENT DOCUMENTS

| | | |
|---|---|---|
| 8,594,350 B2 | 11/2013 | Hooley et al. |
| 9,749,750 B2 | 8/2017 | Kuksenkov et al. |
| 2005/0039215 A1 | 2/2005 | Lienhart et al. |
| 2009/0172200 A1 | 7/2009 | Morrison et al. |
| 2014/0016783 A1 | 1/2014 | Horbach et al. |
| 2017/0286051 A1 | 10/2017 | Mendes et al. |
| 2019/0313143 A1 | 10/2019 | Mackay et al. |

OTHER PUBLICATIONS

Notification of Transmittal of the International Search Report and the Written Opinion of the ISA dated Mar. 1, 2022 for International Application No. PCT/US2021/63767; 1 Page.
International Search Report dated Mar. 1, 2022 for International Application No. PCT/US2021/63767; 2 Pages.
Written Opinion of the ISA dated Mar. 1, 2022 for International Application No. PCT/US2021/63767; 7 Pages.

(Continued)

*Primary Examiner* — Yassin Alata
(74) *Attorney, Agent, or Firm* — DALY, CROWLEY, MOFFORD & DURKEE, LLP (57) ABSTRACT

Systems, methods, and algorithms for estimating the sample clock difference between an audio playback and recording device are described. The sample clock difference can be determined by sequentially playing the same pseudorandom signal and exploiting the statistical properties of said signal in the recording. An exemplary embodiment utilizes a maximum length sequence (MLS) for the pseudorandom signal. While an MLS sequence is a good choice for clock synchronization, it is possible to use other pseudorandom sequences. The sequence preferably has a sharp correlation peak that is clearly discernable with even a single sample shift and be of sufficient length to support the anticipated clock drift.

18 Claims, 4 Drawing Sheets

(56) References Cited

OTHER PUBLICATIONS

TIPO Search Report (with English translation) dated Jul. 12, 2022 for ROC (Taiwan) Patent Application No. 110147517; 5 pages.
Taiwan Intellectual Property Office Notice of Allowance (English translation) dated Dec. 2, 2022 for ROC (Taiwan) Patent Application No. 110147517; 9 pages.
International Search Report and Written Opinion dated Mar. 1, 2022, for International Application No. PCT/US2021/063767; 11 pages.

AUDIO SAMPLING CLOCK SYNCHRONIZATION

CROSS REFERENCE TO RELATED APPLICATIONS

This application claims priority to and benefit of U.S. Provisional Application No. 63/126,563 entitled "Audio Sampling Clock Synchronization for MLS Signal" (filed Dec. 17, 2020), which is incorporated herein by reference in its entirety.

BACKGROUND

Augmenting the factory sound tuning of an audio system such as a television (TV) or high-fidelity stereo system, to account for auditory effects and conditions of any particular room presents several challenges to the designer. The processing bandwidth of the system is a factor, along with the clock rate, and associated sample rate of the audio system. One way of adjusting an audio system is to discern its frequency response across a range of operational frequencies.

The impulse response of an audio system is commonly measured using a maximum length sequence (MLS) as a stimulus. An MLS signal is a type of pseudorandom binary sequence. The sequence is played at the playback device's sample rate. The speaker output is recorded, sampled, and analyzed to determine the system's impulse response. When the playback and recording devices are not using synchronized clocks, the impulse response measurement can be degraded. The resulting measured frequency response (Fourier transform of the impulse response) tends to roll off at higher frequencies when the clocks (and associated sample rates) are not synchronized. For example, when measuring the frequency response of a television speaker at various positions in a room, playback could be based upon the television clock while recording could be based upon an external device clock such as a remote control or smartphone. The external device could utilize a less expensive crystal-based timing reference without the accuracy or tolerance ratings of the reference in the television. When making impulse response measurements at various points in a room, for example, it may be unreasonable or undesirable to use a wired microphone connected to the audio source.

SUMMARY

Embodiments of the present disclosure provide the ability to efficiently adapt a factory "off the shelf" audio system to any given room.

One aspect of the present disclosure, directed to a system and algorithm for estimating the sample clock difference between an audio playback and recording device, is presented here. The sample clock difference can be determined by sequentially playing the same pseudorandom signal and exploiting the statistical properties of said signal in the recording.

Exemplary embodiments or instantiations of the present disclosure can utilize a maximum length sequence (MLS) for the pseudorandom signal. While an MLS sequence is a good choice for clock synchronization, it is possible to use other pseudorandom sequences within the scope of the present disclosure. The sequence that is used preferably has a sharp correlation peak that is clearly discernable with even a single sample shift and be of sufficient length to support the anticipated clock drift.

An exemplary embodiment of the present disclosure includes a system for synchronizing audio playback and record clocks, the system including: a memory including computer-executable instructions; and a processor coupled to the memory and operative to execute the computer-executable instructions, the computer-executable instructions causing the processor to perform operations comprising: (a) playing a same pseudorandom sequence repeatedly on an audio system having a clock with a clock rate and one or more speakers, wherein multiple versions of the sequence are played; (b) recording the played pseudorandom sequences with a recording device having a clock with a clock rate; (c) calculating a lag at a correlation maximum utilizing multiple versions of the sequence; (d) using the maximum correlation lag to calculate an estimate of a difference between clock rates of the audio system and the recording device; and (e) resampling the recorded sequence and/or subsequent recorded audio, producing a resampled audio recording, to synchronize the clocks of the audio system and the recording device.

The pseudorandom sequence can include an MLS sequence. The maximum correlation lag can be calculated from the correlation maximum between two recorded nominal pseudorandom sequences. A spline (e.g., cubic or other) can be utilized to calculate the point of maximum correlation. Resampling of the recorded audio to synchronize the clocks can include multiplying the recording device clock rate by a resampling ratio that is based on a nominal offset and the maximum correlation lag. The resampling ratio can be calculated as a ratio with a numerator including a difference between the nominal offset and the maximum correlation lag and a denominator including the nominal offset. The computer-executable instructions can further include instructions causing the processor to perform operations including calculating the impulse response of the audio system based on the resampled recorded sequence.

A further exemplary embodiment includes a system for measuring the audio impulse response at a listener position utilizing an MLS sequence, the system including: (a) a memory comprising computer-executable instructions; and (b) a processor coupled to the memory and operative to execute the computer-executable instructions, the computer-executable instructions causing the processor to perform operations including: determining a clock difference between (i) a clock of a playback device playing sequentially recorded nominal MLS sequences, and (ii) a recording device recording the MLS sequences played by the playback device.

The processor can be operative to calculates a maximum correlation lag at a correlation maximum in order to determine the clock difference and utilizes the difference to synchronize the clocks by resampling the recorded sequence. The maximum correlation lag can be calculated from the correlation between two recorded nominal MLS sequences. A spline can be utilized to calculate the maximum correlation lag. Resampling of the recorded sequence to synchronize the clocks can include multiplying the recording device clock rate by a resampling ratio that is based on a nominal offset and the maximum correlation lag. The resampling ratio can be calculated as a ratio with a numerator including a difference between the nominal offset and the maximum correlation lag and a denominator including the nominal offset.

Another exemplary embodiment includes a method or algorithm (method/algorithm) for synchronizing audio playback and record clocks, the method including: (a) playing a same pseudorandom sequence (as a stimulus signal/sequence) repeatedly on an audio system having a clock with a (e.g., first) clock rate and one or more speakers, wherein multiple versions of the sequence are played; (b) recording the played pseudorandom sequences with a recording device having a clock with a (e.g., second) clock rate; (c) calculating a lag at a correlation maximum between the multiple versions of the sequence (stimulus signal/sequence); (d) using the lag to calculate an estimate of a difference between clock rates of the audio system and the recording device; and (e) resampling the recorded sequence and/or subsequent recorded audio, producing resampled recorded audio, to synchronize the clocks.

The method/algorithm can include calculating the impulse response of the audio system based on the resampled recorded sequence. Resampling of the recorded sequence and/or subsequent recorded audio to synchronize the clocks can include multiplying the recording device clock rate by a resampling ratio that is based on a nominal offset and the maximum correlation lag. The resampling ratio can be calculated as a ratio with a numerator including a difference between the nominal offset and the maximum correlation lag and a denominator including the nominal offset A further exemplary embodiment includes a computer-readable non-transitory storage medium comprising instructions which, when executed by a computer, cause the computer to carry out the steps of the method(s) described previously (or elsewhere herein).

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

As noted above, audio playback systems and recording devices can have differing clock rates, which can degrade performance of impulse response measurements of the audio system. For example, when measuring the frequency response of a television speaker at various positions in a room, playback could be based upon the television clock while recording could be based upon an external device clock such as a remote control or smartphone. The external device could utilize a less expensive crystal-based timing reference without the accuracy or tolerance ratings of the reference in the television. When making impulse response measurements at various points in a room, for example, it may be impractical or undesirable to use a wired microphone connected to the audio source. When the playback and recording devices are not using synchronized clocks, the impulse response measurement can be degraded. The resulting measured frequency response (Fourier transform of the impulse response) tends to roll off at higher frequencies when the clocks are not synchronized.

One aspect of the present disclosure is directed to a system and algorithm for estimating the sample clock difference between an audio playback and recording device. The sample clock difference is determined by sequentially playing a (same) pseudorandom signal (PRS) or binary sequence (PRBS) and exploiting the statistical properties of the signal/sequence in the recording. Accordingly, embodiments of the present disclosure can be used to measure the impulse response of an audio system more accurately than in prior approaches/techniques. A pseudorandom binary sequence, e.g., an MLS, can be used for the measurement process. Such a sequence is played at the playback device's (audio system's) sample rate. The speaker output is recorded, sampled, and analyzed to determine the system's impulse response. Embodiments of the present disclosure can be used to correct for this clock rate mismatch.

Exemplary embodiments utilize a maximum length binary sequence (MLS) for the pseudorandom signal/sequence. While an MLS sequence is a good choice for clock synchronization, it is possible to use other pseudorandom sequences. Examples can include, but are not limited to, Kasami sequences, Gold sequences, and/or JPL sequences; of course, other pseudorandom sequences/signals may be utilized within the scope of the present disclosure. The signal or sequence (the term "sequence" can include "signal") preferably has a sharp correlation peak (when correlated with itself in an autocorrelation step or process) that is clearly discernable with even a single sample shift and be of sufficient length to support the anticipated clock drift.

Figure 1:
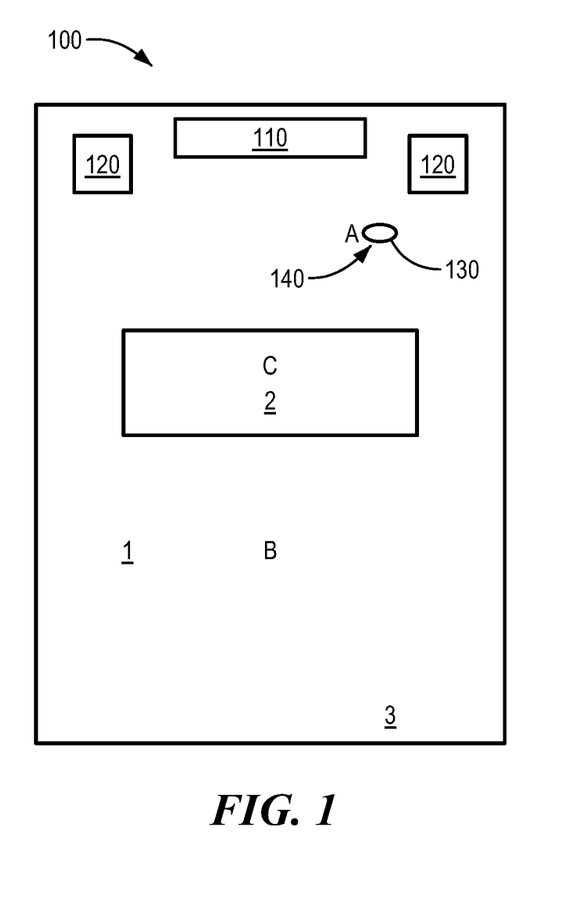
FIG. 1 is a diagram showing application of an audio stimulus signal to a general audio system for audio system clock synchronization, in accordance with embodiments of the present disclosure.

FIG. 1 is a diagram 100 showing application of a system/method/algorithm 100 for audio clocking synchronization of an audio stimulus signal to a generic audio system 110 for audio system clock synchronization, in accordance with embodiments of the present disclosure. The impulse response and frequency response of audio system 110 in an audio environment, e.g., a representative room 1—presenting a unique audio environment with furniture 2 or other appurtenance, a door 3, etc.—are measured and audio system clock synchronization is applied. The components of generic audio system 110 can include one or more speakers 120 playing a recording of a repeated PRBS (e.g., MLS) sequence, which in exemplary embodiments can be included in or part of a TV with the recording played out each speaker. But, in other embodiments, the speaker 120 could be a standalone wireless speaker, wired speaker, or soundbar or the like. A recording device 130 with microphone is used to record the played recording. —In exemplary embodiments or instantiations of the present disclosure, recording device 130 could be a smart phone or remote control with wireless communication means or functionality (e.g., implementing a wireless transmission protocol such as Bluetooth, 5G, 6G, 4G LTE, etc.) positioned at a desired location (e.g., locations A, B, or C) in the room 1; the location can correspond to a typical or desired location of a listener position.

A processing device or system 140 is included, which is operative/functional to calculate the room impulse response and frequency response after implementing an embodiment (inventive technique) for synchronizing playback and record clocks in accordance with the present disclosure. In exemplary embodiments or instantiations of the present disclosure, a smartphone (processing its own recording) or a TV (processing a recording transferred wirelessly by the recording device) or a cloud-based server (processing a recording transferred via the internet) can include or compose the processing system or device 140. To measure the impulse response with MLS, the audio path is preferably uncompressed, i.e., all compression should be turned off.

Figure 2:
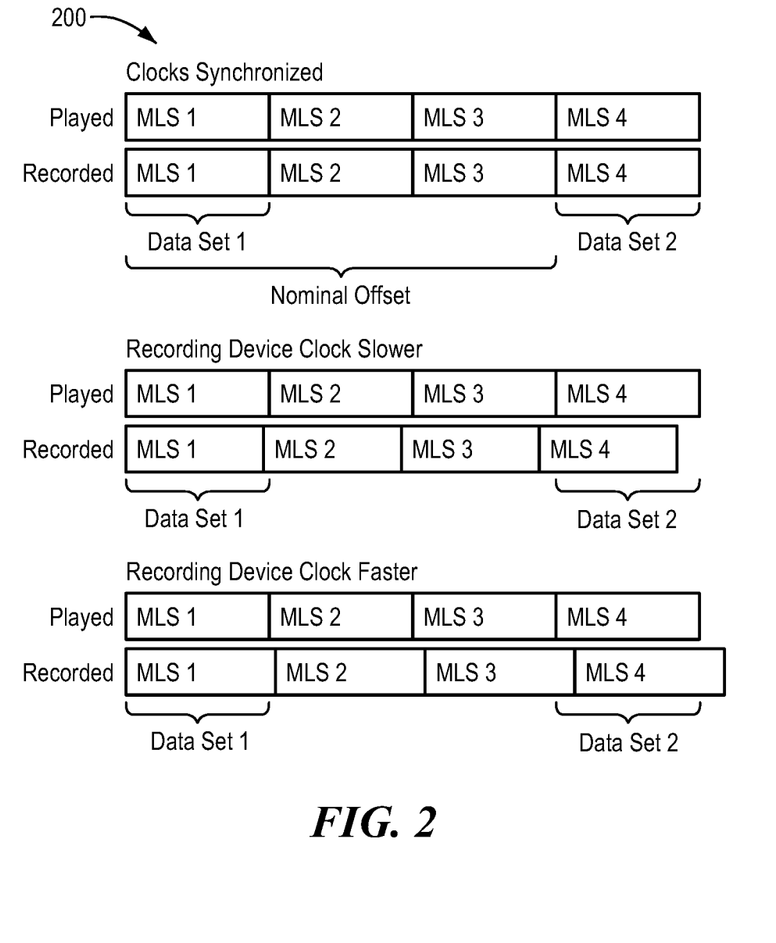
FIG. 2 is a diagram showing three clocking variations for MLS playback/record systems, in accordance with the present disclosure.

Exemplary embodiments of the present disclosure provide an algorithm or method (as well as a system) for estimating the recording device's sample clock rate based on a comparison between the original or initial stimulus signal/sequence (e.g., a played MLS sequence such as shown in FIG. 2) and the recorded signal/sequence (recording of the stimulus signal/sequence). The recording can be resampled using conventional resampling algorithms. The resampled recording can be used to then compute a far more accurate impulse response, compared to prior techniques.

As shown in FIG. 2, a stimulus signal (played signal) can use a given MLS sequence repeated multiple times. In this example, an MLS sequence of order 16 is repeated 4 times. But other orders can be used and the number of repetitions (reps) can vary. Typically, higher orders and more repetitions will be less susceptible to noise and will provide a more accurate overall impulse response measurement, but will take more time to play, record, and compute.

In the example stimulus signal (played signal) of FIG. 2, the number of samples between the first samples of the first and last MLS sequences is given by:

$$\text{Nominal Offset} = (2^{order}-1)*(\text{reps}-1) = (2^{16}-1)*(4-1) \\ = 196{,}605 \text{ samples} \quad \text{(EQ. 1)}$$

Selecting the first 65,535 samples of the stimulus gives the first MLS sequence. Selecting the 65,535 samples starting at the 196,606th sample gives the fourth MLS sequence. If a cross-correlation is performed between these two identical sets of data (played MLS 1 and MLS 4), they will have their maximum correlation at a lag of 0 where they are aligned.

FIG. 2 is a diagram 200 showing an example of three clocking variations for MLS playback/record systems, in accordance with an embodiment of the present disclosure. It is assumed that compensation has already occurred for any system latency so the starting point of MLS 1 in the recorded sequence is known. The nominal starting point of the MLS 4 sequence is estimated by counting 196,605 samples from the beginning of the recorded MLS 1. For the case where the sample clocks are synchronized, the nominal starting point of the recorded MLS 4 sequence will align exactly with the played MLS 4 sequence. Performing a cross correlation between these two sets of data (recorded nominal MLS 1 and 4) would also result in a maximum at a lag of 0. But, if the clocks are asynchronous, the second data set will not align exactly. Over time, each repeated played MLS sequence will drift further from a starting point calculated by counting samples in the recording. The fourth nominal MLS sequence will be more misaligned than the earlier sequences.

As shown in FIG. 2, when the recording sample clock is slower, the 196,606$^{th}$ sample will occur before the beginning of the played MLS 4 sequence. When the recording sample clock is faster the 196,606th sample will occur after the beginning of the played MLS 4 sequence. Performing a cross correlation on these sequences (recorded nominal MLS 1 and 4) will give a maximum that is at a non-zero lag. This lag can be used to compute the relative difference between the playback and recording devices' sample clocks.

Figure 3:
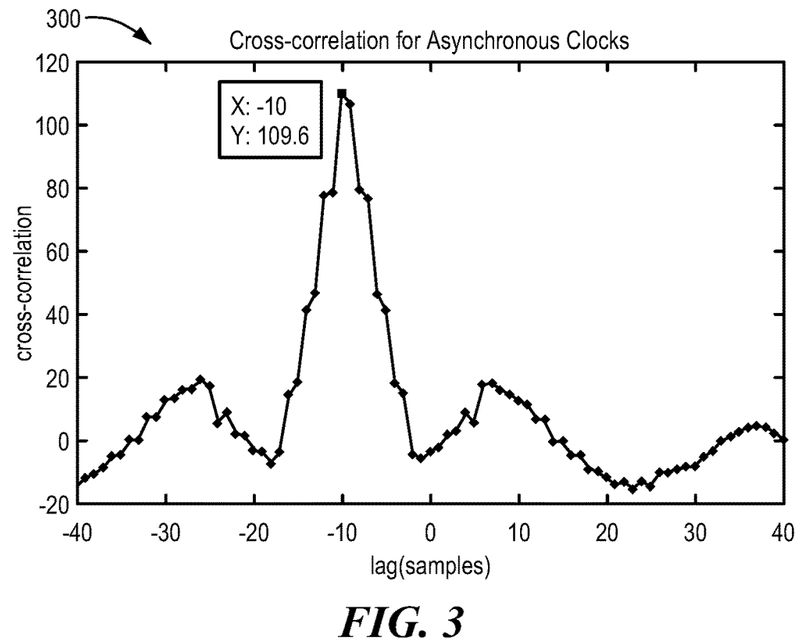
FIG. 3 is a plot showing an example cross-correlation for asynchronous clocks, in accordance with the present disclosure.

FIG. 3 is a graph 300 of cross-correlation between MLS sequences that are offset in timing, accordance to an example of the present disclosure. In the example shown in FIG. 3, the maximum occurs at a lag of −10 samples.

Figure 4:
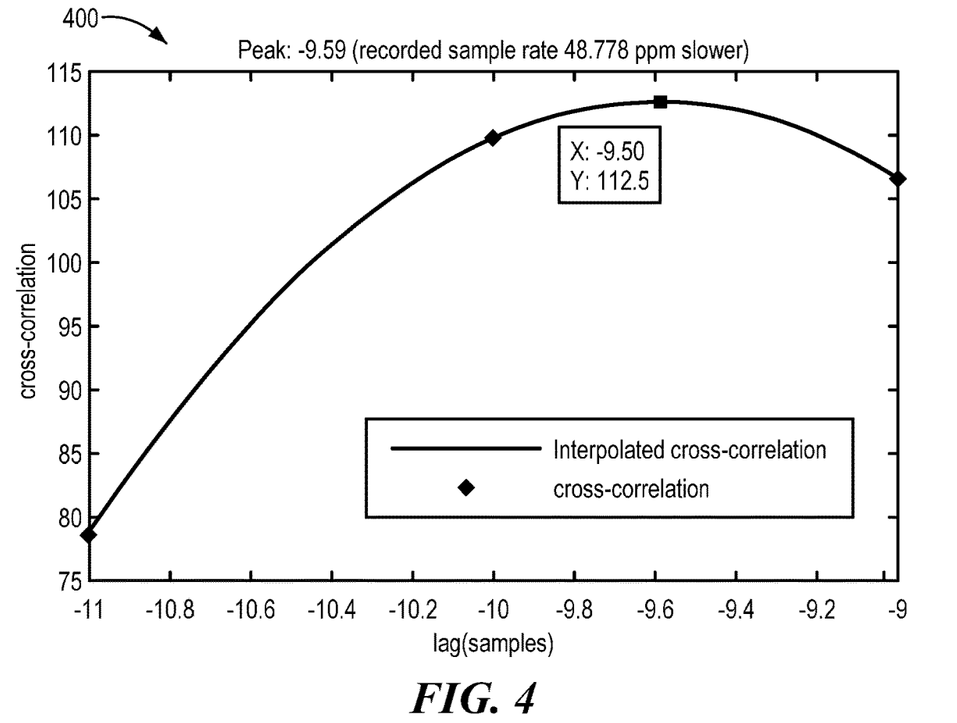
FIG. 4 is a plot showing interpolation of cross-correlation data, in accordance with exemplary embodiments of the present disclosure.

The lag, which can be referred to as a maximum correlation lag, can be computed more precisely by taking the three points nearest the maximum (lags −11, −10, and −9) and performing an interpolation between them using a cubic spline. In this example, we compute the 100 points between each lag and identify that the interpolated maximum occurs at a lag of −9.59, as shown in FIG. 4.

The relative sample rate of the recording device to the playback device can be computed as follows:

$$F_{sRel} = \text{lag/nominal offset} = -9.59/196{,}605 = -48.78 \text{ ppm} \quad \text{(EQ. 2)}$$

Thus, for this scenario, the recorded sample rate is 48.78 ppm slower than the playback sample rate.

The recording can be resampled at a resampling ratio given by the following:

$$\text{Resample Ratio} = (\text{nominal offset} - \text{lag})/\text{nominal offset} = \quad \text{(EQ. 3)}$$
$$(196{,}605 + 9.59)/196{,}605 = 1.00004878$$

A cubic spline, or other suitable spline, can be used to perform the resampling, in accordance with the present disclosure. In alternate embodiments, polynomial interpolation or other types of interpolation—or other suitable numerical methods—may be used for resampling.

For the example of measuring the impulse response of television audio at various positions in a room, the system configuration could include a Bluetooth/WiFi capable television and a Bluetooth/WiFi capable smartphone. Upon instigation by an application on the smartphone, the television could play an audio burst of a repeated, 16th order, MLS sequence at a 48 kHz sample rate referenced to the television internal clock. The smartphone, when positioned in the desired location in the room, would record the audio burst at a 48 kHz sample rate referenced to the smartphone internal clock. The impulse response, and resulting frequency response, of the listening environment could be calculated by the smartphone CPU, using the techniques of this invention, from the recording. Or the smartphone could send the recorded samples to the television via Bluetooth or WiFi and the recording could be utilized by the television CPU to calculate the impulse response and resulting frequency response. Alternatively, "cloud computing" could be utilized to calculate the desired responses by sending the recording to a server on the network.

Figure 5:
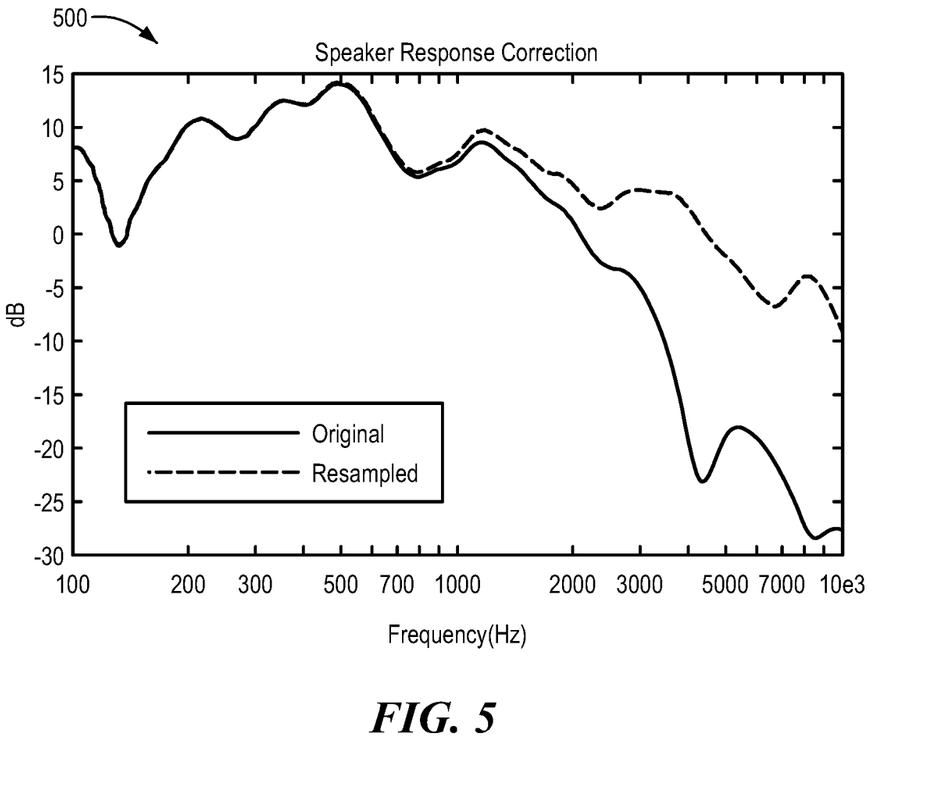
FIG. 5 is a plot showing measured frequency response before and after resampling, in accordance with exemplary embodiments of the present disclosure.

FIG. 5 is a plot 500 showing the high frequency roll-off that occurs when the playback and record clocks are asynchronous. The Original plot represents the smoothed Fourier transform of the impulse response derived from the original MLS sequence recording using a recording device sample rate that is −43 ppm slower than the playback rate. The Resampled plot shows the measured frequency response after measuring the clock difference, using the method described herein, and resampling the recording based upon the measured difference. The Resampled plot is a reasonable measurement of the actual system frequency response. One can see that before resampling, the frequency response begins to roll off significantly after about 1 kHz.

Figure 6:
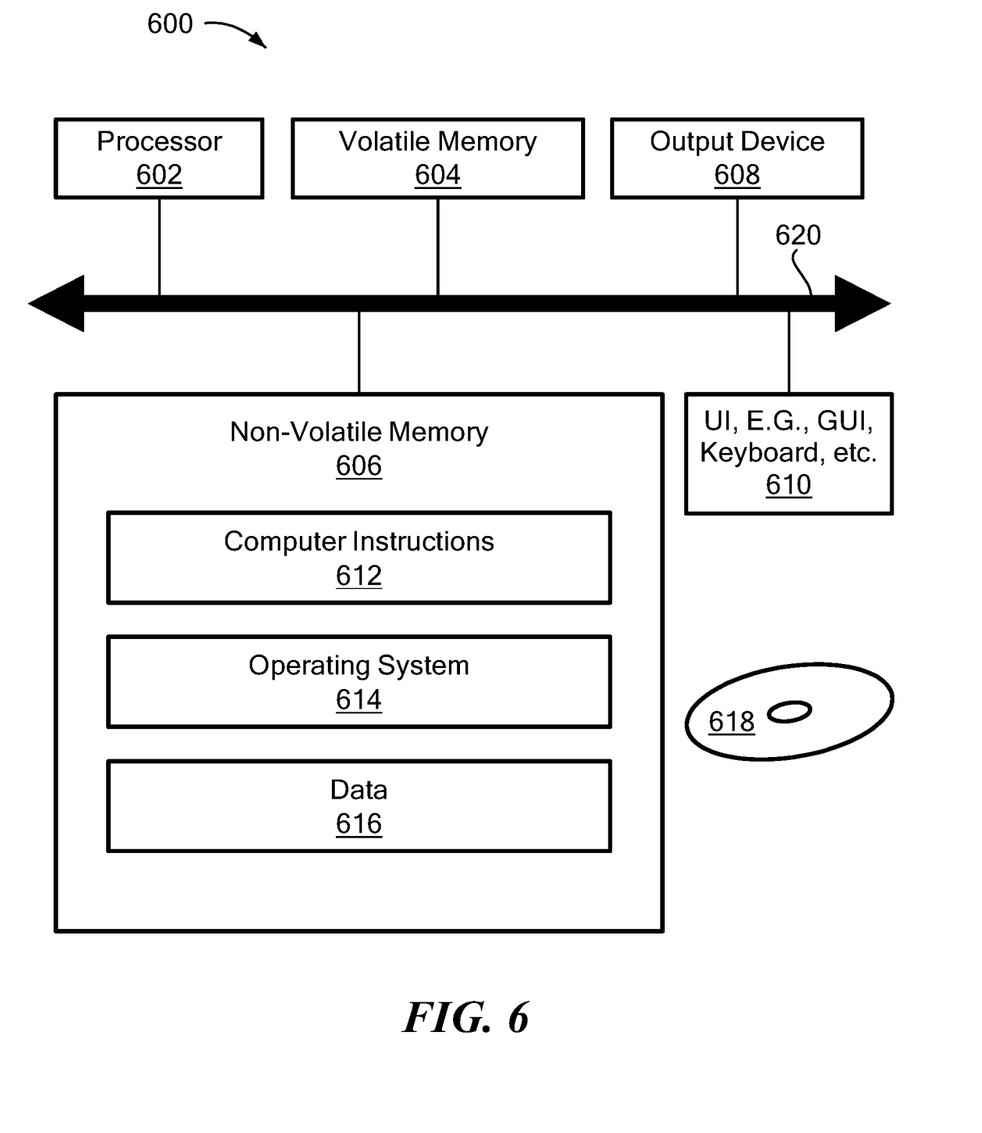
FIG. 6 is a schematic diagram of an example computer system that can perform all or at least a portion of methods, algorithms, and processing according to the present disclosure.

FIG. 6 is a schematic diagram of an example computer system 600 that can perform all or at least a portion of the processing, e.g., steps in the algorithms and methods described herein and/or solving of equations any of the equations (e.g., EQS. 1-3) described herein. The computer system 600 includes a processor 602, a volatile memory 604, a non-volatile memory 606 (e.g., hard disk), an output device 608 and a user input or interface (UI) 610, e.g., graphical user interface (GUI), a mouse, a keyboard, a display, or any common user interface, etc. The non-volatile memory (non-transitory storage medium) 606 stores computer instructions 612 (a.k.a., machine-readable instructions or computer-readable instructions) such software (computer program product), an operating system 614 and data 616. In one example, the computer instructions 612 are executed by the processor 602 out of (from) volatile memory 604. In one embodiment, an article 618 (e.g., a storage device or medium such as a hard disk, an optical disc, magnetic storage tape, optical storage tape, flash drive, etc.) includes or stores the non-transitory computer-readable instructions. Bus 620 is also shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 600 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Accordingly, embodiments of the inventive subject matter can afford benefits relative to prior art techniques. Such benefits may include, but are not limited to, adapting an off-the-shelf audio system, such as in a high-end television, to a given, particular room or other physical location presenting a specific or unique auditory environment with a set of acoustic properties.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising, "include," "includes," "including," "has," "having," "contains" or "containing," or any other variation are intended to cover a non-exclusive inclusion. For example, an apparatus, a method, a composition, a mixture, or an article, which comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal," "top," "bottom," and derivatives of those terms relate to the described structures and methods as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A system for synchronizing audio playback and record clocks, the system comprising:
   a memory comprising computer-executable instructions; and
   a processor coupled to the memory and operative to execute the computer-executable instructions, the computer-executable instructions causing the processor to perform operations comprising:
   a. playing a same pseudorandom sequence repeatedly on an audio system having a clock with a clock rate and one or more speakers, wherein multiple versions of the sequence are played;
   b. recording the played pseudorandom sequences with a recording device having a clock with a clock rate;
   c. calculating a lag at a correlation maximum utilizing multiple versions of the sequence;
   d. using the maximum correlation lag to calculate an estimate of a difference between clock rates of the audio system and the recording device; and
   e. resampling the recorded sequence and/or subsequent recorded audio, producing a resampled audio recording, to synchronize the clocks of the audio system and the recording device.

2. The system of claim 1, wherein the pseudorandom sequence comprises a maximum length sequence (MLS).

3. The system of claim 1, wherein the maximum correlation lag is calculated from the correlation maximum between two recorded nominal pseudorandom sequences.

4. The system of claim 1, wherein a spline is utilized to calculate the point of maximum correlation.

5. The system of claim 1, wherein resampling the recorded audio to synchronize the clocks includes multiplying the recording device clock rate by a resampling ratio that is based on a nominal offset and the maximum correlation lag.

6. The system of claim 5, wherein the resampling ratio is calculated as a ratio with a numerator including a difference between the nominal offset and the maximum correlation lag and a denominator including the nominal offset.

7. The system of claim 1, wherein the computer-executable instructions further comprise instructions causing the processor to perform operations including calculating the impulse response of the audio system based on the resampled recorded sequence.

8. A system for measuring the audio impulse response at a listener position utilizing a maximum length sequence (MLS), the system comprising:
   a. a memory comprising computer-executable instructions; and
   b. a processor coupled to the memory and operative to execute the computer-executable instructions, the computer-executable instructions causing the processor to perform operations comprising:

determining a clock difference between (i) a clock of a playback device playing sequentially recorded nominal maximum length sequences (MLSs), and (ii) a clock of a recording device recording the sequentially recorded nominal maximum length sequences (MLS) played by the playback device.

9. The system of claim 8, wherein the processor is operative to calculate a maximum correlation lag at a correlation maximum in order to determine the clock difference and utilizes the difference to synchronize the clocks by resampling the recorded sequence.

10. The system of claim 9, wherein the maximum correlation lag is calculated from the correlation between two recorded nominal maximum length sequences (MLS).

11. The system of claim 10, wherein a spline is utilized to calculate the maximum correlation lag.

12. The system of claim 9, wherein resampling the recorded sequence to synchronize the clocks includes multiplying the recording device clock rate by a resampling ratio that is based on a nominal offset and the maximum correlation lag.

13. The system of claim 12, wherein the resampling ratio is calculated as a ratio with a numerator including a difference between the nominal offset and the maximum correlation lag and a denominator including the nominal offset.

14. A method for synchronizing audio playback and record clocks, the method comprising:

a. playing a same pseudorandom sequence repeatedly on an audio system having a clock with a clock rate and one or more speakers, wherein multiple versions of the sequence are played;
b. recording the played pseudorandom sequences with a recording device having a clock with a clock rate;
c. calculating a lag at a correlation maximum utilizing the multiple versions of the sequence;
d. using the lag to calculate an estimate of a difference between clock rates of the audio system and the recording device; and
e. resampling the recorded sequence and/or subsequent recorded audio, producing resampled recorded audio, to synchronize the clocks.

15. The method of claim 14, further comprising calculating the impulse response of the audio system based on the resampled recorded sequence.

16. The method of claim 14, wherein resampling the recorded sequence and/or subsequent recorded audio to synchronize the clocks includes multiplying the recording device clock rate by a resampling ratio that is based on a nominal offset and the maximum correlation lag.

17. The method of claim 16, wherein the resampling ratio is calculated as a ratio with a numerator including a difference between the nominal offset and the maximum correlation lag and a denominator including the nominal offset.

18. A computer-readable non-transitory storage medium comprising instructions which, when executed by a computer, cause the computer to carry out the steps of the method of claim 14.

* * * * *